(12) United States Patent
Saito et al.

(10) Patent No.: US 6,379,822 B1
(45) Date of Patent: Apr. 30, 2002

(54) HEAT RESISTANT ADHESIVE

(75) Inventors: Kazuo Saito; Takashi Hironaka, both of Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 08/128,740

(22) Filed: Sep. 30, 1993

Related U.S. Application Data

(63) Continuation of application No. 07/707,735, filed on May 30, 1991, now abandoned.

(30) Foreign Application Priority Data

| Jun. 1, 1990 | (JP) | ............................................. 2-143906 |
| Jun. 1, 1990 | (JP) | ............................................. 2-143907 |
| Nov. 30, 1990 | (JP) | ............................................. 2-338781 |

(51) Int. Cl.⁷ ............................................... B32B 18/00
(52) U.S. Cl. ................... 428/688; 423/445 R; 264/29.1
(58) Field of Search ............................... 156/325, 326, 156/327, 350.9, 331.7; 264/29.1, 29.5, 29.6, 29.7; 423/445 R; 428/688

(56) References Cited

U.S. PATENT DOCUMENTS

| 4,118,536 A | * | 10/1978 | Beardsley et al. ........ 427/385.5 |
| 4,273,879 A | * | 6/1981 | Langer et al. ................ 521/91 |
| 4,513,173 A | * | 4/1985 | Merry .................... 174/121 A |
| 4,624,766 A | * | 11/1986 | Boxall et al. ................ 264/105 |
| 4,975,261 A | * | 12/1990 | Takabatake .................. 423/445 |
| 5,084,211 A | * | 1/1992 | Kawaguchi et al. ......... 252/511 |
| 5,152,941 A | * | 10/1992 | Takaku et al. ............. 264/29.6 |
| 5,180,529 A | * | 1/1993 | Takaku et al. ............. 264/29.6 |

* cited by examiner

*Primary Examiner*—Christopher A. Fiorilla
(74) *Attorney, Agent, or Firm*—Kubovcik & Kubovcik

(57) ABSTRACT

A heat-resistant adhesive with excellent adhesion strength and an adhesion method using the adhesive which includes an easily carbonizable resin such as a polycarbodiimide resin and, as necessary, a powdery filler (e.g. graphite powder, carbon powder, coke powder etc.) and a pitch.

9 Claims, No Drawings

HEAT RESISTANT ADHESIVE

This application is a continuation of application Ser. No. 07/707,735 filed May 30, 1991 (now abandoned).

BACKGROUND OF THE INVENTION (1) Field of the Invention

The present invention relates to a heat-resistant adhesive and an adhesion method using the adhesive. More particularly, the present invention relates to a heat-resistant adhesive with excellent adhesion strength and an adhesion method using the adhesive.

(2) Prior Art

Heat-resistant materials such as carbon materials, ceramics and the like show no melting point or have a very high melting point, so that they are used under various high temperature conditions.

In processing these heat-resistant materials into molded articles, particularly those of large size or complicated shape, there have been pointed out problems such as necessity of large furnace, necessity of mold or post-treatment and consequent high production cost. Therefore, if it is possible to produce necessary parts of a desired molded article beforehand and assemble the parts with an adhesive into the desired molded article, the production steps of the molded article will be simplified and its production cost will be reduced.

Meanwhile, conventional organic compound adhesives are usable at a temperature range of 200–300° C. and accordingly are unsuited for adhesion of heat-resistant materials used under high temperature conditions. This has posed a limitation to the applications of carbon materials.

As a heat-resistant adhesive, there is also known, for example, an adhesive obtained by solidifying a ceramic powder with a binder resin. This adhesive, however, has a low adhesion strength and moreover is unusable for adhesion of flat-surfaced materials.

SUMMARY OF THE INVENTION

The present invention has been made in order to solve the above-mentioned problems of the prior art and provide a heat-resistant adhesive with excellent adhesion strength and an adhesion method using the adhesive.

In order to achieve the above object, the present invention provides a heat-resistant adhesive comprising an easily carbonizable resin as a main component.

In order to achieve the above object, the present invention further provides a heat-resistant adhesive comprising an easily carbonizable resin and a powdery filler as main components.

In order to achieve the above object, the present invention furthermore provides a heat-resistant adhesive comprising an easily carbonizable resin, a powdery filler and a pitch as main components.

In order to achieve the above object, the present invention moreover provides an adhesion method comprising placing one of the above-mentioned heat-resistant adhesives between two materials to be adhered to each other and then subjecting them to a heat treatment to adhere the two materials to each other.

The present inventors made a study in order to solve the above problems of the prior art. In the study, the present inventors paid special attention to resins (e.g. polycarbodiimide resin) carbonizable by firing in a vacuum or in an inert atmosphere, and found that when an easily carbonizable resin(e.g. polycarbodiimide resin) was placed between heat-resistant materials (as mentioned above) to be adhered and they were fired at a temperature of 350° C. or more, the heat-resistant materials could be well adhered to each other. This finding has led to the completion of the first adhesive of the present invention.

The present inventors made a further study to provide an adhesive with improved adhesion strength, capable of adhering even heat-resistant materials having a polished surface, strongly to each other. As a result, the present inventors found that an adhesive obtained by mixing an easily carbonizable resin (e.g. polycarbodiimide resin) with a powdery filler (e.g. graphite powder, carbon powder, coke powder etc.) gave good results. The finding has led to the completion of the second adhesive of the present invention.

The present inventors a study to achieve an even higher adhesion strength and, as a result, found that an adhesive obtained by mixing a polycarbodiimide resin with a powdery filler (e.g. graphite powder, carbon powder, coke powder etc.) and a pitch gave good results. The finding has led to the completion of the third adhesive of the present invention.

DETAILED DESCRIPTION OF THE INVENTION

The present invention is hereinafter described in detail.

The easily carbonizable resin used in the present invention refers to, as explained above, a resin carbonizable by firing in vacuum or in an inert atmosphere, such as polycarbodiimide resin.

The polycarbodiimide resin used in the present invention can be a known polycarbodiimide resin or a polycarbodiimide resin which can be produced in the same manner as for known polycarbodiimide resins [reference is made to U.S. Pat. No. 2,941,966; Japanese Patent Publication No.33297/1972; J. Org. Chem., 28, 2069–2075 (1963); Chemical Review, 1981, Vol. 81, No. 4, 619–621; etc.]. It can be easily produced by subjecting an organic diisocyanate to a condensation reaction wherein the elimination of carbon dioxide takes place.

The organic diisocyanate used in the production of a polycarbodiimide resin can be any of aliphatic type, alicyclic type, aromatic type, aromatic-aliphatic type, etc. They can be used alone or in combination of two or more (the latter case gives a copolymer).

The polycarbodiimide resin used in the process of the present invention includes a homopolymer or a copolymer both having at least one repeating unit represented by the formula

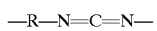

wherein R represents an organic diisocyanate residue.

As the R (organic diisocyanate residue) in the formula, there are particularly preferred an aromatic diisocyanate residue [In the present specification, the "organic diisocyanate residue" refers to a portion remaining after subtracting two isocyanate (NCO) groups from an organic diisocyanate molecule.].

The polycarbodiimidization catalyst has no particular restriction and can be illustrated by conventionally used phosphorene oxides such as 1-phenyl-2-phosphorene-1-oxide, 3-methyl-2-phosphorene-1-oxide, 1-ethyl-3-methyl-2-phosphorene-1-oxide, 1-ethyl-2-phosphorene-1-oxide and 3-phosphorene isomers thereof or the like.

Specific examples of the polycarbodiimide resin include the following.

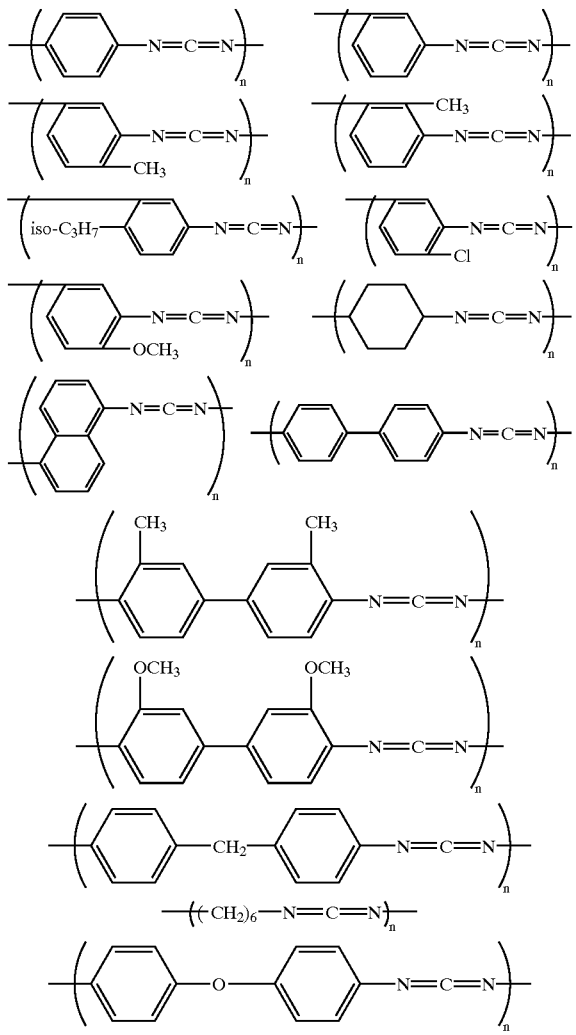

In the above formulas, n is a degree of polymerization and is in the range of 10–10,000, preferably in the range of 50–5,000.

Incidentally, the terminal(s) of the polycarbodiimide resin may be blocked with a monoisocyanate or the like, and the polycarbodiimide resin described above can be obtained in a solution form, or as a powder precipitated from the solution.

The first adhesive of the present invention comprises, as a main component, an easily carbonizable resin such as the above-obtained polycarbodiimide resin. It can be processed into desired forms such as sheet, fiber and the like, in the same manner as employed in ordinary polymer molding. The obtained fiber can further be processed into a paper, a cloth, etc.

The second adhesive of the present invention is obtained by mixing an easily carbonizable resin such as the above-obtained polycarbodiimide resin with a powdery filler.

As the powdery filler, there can be mentioned, for example, a graphite powder, a carbon powder and a coke powder etc. The particle diameters of these powdery fillers are preferably 0.01–100 $\mu$m, more preferably 0.1–40 $\mu$m.

As the graphite powder, there can be used synthetic graphite, natural graphite, etc. As the carbon powder, there can be used carbon black, carbon obtained by thermal cracking, a powder obtained by carbonization of coke, etc. As the coke, there can be used petroleum coke, coal coke, etc. That is, the powdery filler usable in the present invention is a filler which can be used as a material for synthetic graphite.

The third adhesive of the present invention is obtained by mixing an easily carbonizable resin such as the above-obtained polycarbodiimide resin with a powdery filler and a pitch.

As the pitch usable in the present invention, there can be mentioned, for example, a binder pitch, an impregnating pitch and an asphalt pitch.

In the second adhesive of the present invention, the proportion of the powdery filler can be, for example, 100 to 5 parts by weight, preferably 90 to 10 parts by weight per 100 parts by weight of the easily carbonizable resin. In the third adhesive of the present invention, the proportions of the powdery filler and the pitch can be, for example, 80–5 parts by weight, preferably 60–10 parts by weight and 50–5 parts by weight, preferably 40–10 parts by weight, respectively, per 100 parts by weight of the easily carbonizable resin.

Similarly to the first adhesive of the present invention, the second and third adhesives of the present invention can also be used in desired forms such as solution, sheet, powder, paper and the like.

In effecting adhesion using the thus obtained heat-resistant adhesive, firstly the adhesive of the present invention is interposed between materials to be adhered, by coating on the material or by putting it between them. The materials to be adhered can be any materials such as carbon materials, ceramic materials, glass materials, other heat-resistant materials and the like.

Then, the materials having the adhesive of the present invention between them are subjected to a heat treatment to fire and carbonize the adhesive, whereby the materials are adhered to each other. The heat treatment is effected at a temperature of, for example, 350° C. or more in a non-oxidizing atmosphere such as vacuum, inert gas or the like. The temperature of the heat treatment can be determined depending upon the heat-resistant temperature of the materials to be adhered, but is preferably in a range of 350–3,500° C.

Before the above-mentioned heat treatment, it is possible to conduct a pre-heating, for example, at 60–300° C. for 10 minutes 4 hours in order to stiffen the adhesive of the present invention.

The heat-resistant adhesive of the present invention comprises an easily carbonizable resin such as a polycarbodiimide resin and, as necessary, a powdery filler (e.g. graphite powder, carbon powder, coke powder etc.) and a pitch, so that the adhesive can strongly adhere heat-resistant materials and even materials having a polished surface.

The present invention is hereinafter described in more detail by way of Examples.

Example 1

54 g of a 80:20 mixture of 2,4-tolylene diisocyanate and 2,6-tolylene diisocynate (TDI) was subjected to a reaction at 120° C. for 4 hours in the presence of 0.12 g of a polycarbodiimidization catalyst (1-phenyl-3-methylphosphorene oxide) in 500 ml of tetrachloroethylene, to obtain a polycarbodiimide resin solution.

1-A

The polycarbodiimide resin solution was concentrated to 30% relative to the volume before concentration, using an evaporator.

The concentrate was placed between
1-A-1 graphite plates,
1-A-2 alumina plates or
1-A-3 silicon carbide plates.

Then the plates were dried at 120° C. for 2 hours in a dryer, and fired at 1,200° C. in vacuum, whereby the two plates were adhered to each other.

The thus obtained three materials were subjected to a tensile test. The results are shown in Table 1.

1-B

Using a polycarbodiimide resin solution obtained in the same manner as above, a polycarbodiimide sheet was prepared by a dry method.

The sheet was placed between
1-B-1 graphite plates,
1-B-2 alumina plates or
1-B-3 silicon carbide plates.

Then, press bonding was effected at 200° C., after which firing was effected in the same manner as in the case of 1-A. The thus obtained three materials were subjected to a tensile test. The results are shown in Table 1.

1-C

Using a polycarbodiimide resin solution obtained in the same manner as above, a polycarbodiimide fiber was prepared by a dry method. The fiber was processed into a cloth using a weaving machine.

The cloth was placed between
1-C-1 graphite plates,
1-C-2 alumina plates or
1-C-3 silicon carbide plates.

Then, press bonding was effected at 200° C., after which firing was effected in the same manner as in the case of 1-A. The thus obtained three materials were subjected to a tensile test. The results are shown in Table 1.

1-D

The fiber obtained in 1-C was cut to prepare a polycarbodiimide paper.

The paper was placed between
1-D-1 graphite plates,
1-D-2 alumina plates or
1-D-3 silicon carbide plates.

Then, press bonding was effected at 200° C., after which firing was effected in the same manner as in the case of 1-A. The thus obtained three materials were subjected to a tensile test. The results are shown in Table 1.

TABLE 1

| Example No. | Adhesion strength (kg/cm$^2$) | Destruction |
| --- | --- | --- |
| 1-A-1 | 15.7 | Part of adhered plates |
| 1-A-2 | 13.2 | " |
| 1-A-3 | 15.0 | " |
| 1-B-1 | 19.5 | " |
| 1-B-2 | 17.5 | " |
| 1-B-3 | 19.7 | " |
| 1-C-1 | 15.0 | " |
| 1-C-2 | 14.2 | " |
| 1-C-3 | 15.3 | " |
| 1-D-1 | 15.7 | " |
| 1-D-2 | 15.6 | " |
| 1-D-3 | 15.6 | " |

Destruction at "part of adhered plates" in Table 1 does not mean peeling at the interface of adhered plates but means destruction at the part of adhered plates contacting with the adhesive. Therefore, such destruction implies good adhesion.

EXAMPLE 2

The same polycarbodiimide resin solution as used in Example 1-A was placed between quartz plates, then dried at 120° C. for 2 hours in a dryer, and fired at 1,500° C. in a vacuum, whereby the quartz plates were adhered.

The adhered quartz plates were subjected to a tensile test. The tensile strength was 15.0 kg/cm$^2$.

COMPARATIVE EXAMPLE 1

A liquid phenolic resin [Sumilite Resin (trade name) manufactured by Sumitomo Bakelite] was placed between graphite plates, then dried at 80° C. for 1 hour and at 150° C. for 1 hour in a dryer, and fired at 1,200° C. in a vacuum, whereby the graphite plates were adhered.

The adhered graphite plates were subjected to a tensile test. The tensile strength was 3.0 kg/cm$^2$.

COMPARATIVE EXAMPLE 2

A polyacrylonitrile resin powder was dissolved in dimethylformamide to prepare a 30% polymer solution. The solution was placed between graphite plates, then dried at 120° C. for 1 hour and at 160° C. for 1 hour in a dryer, and fired at 1,200° C. in vacuum, whereby the graphite plates were adhered.

The adhered graphite plates were subjected to a tensile test. The tensile strength was 2.5 kg/cm$^2$.

COMPARATIVE EXAMPLE 3

A polyimide varnish [Torayneece (trade name) manufactured by TORAY INDUSTRIES, INC.] was placed between graphite plates, then heat-treated at 120° C. for 30 minutes and at 250° C. for 30 minutes in a dryer, and fired at 1,200° C. in vacuum, whereby the graphite plates were adhered.

The adhered graphite plates were subjected to a tensile test. The tensile strength was 1.0 kg/cm$^2$.

EXAMPLE 3

The adhered materials obtained in Example 1-A were fired again at 3,000° C. in argon.

The resulting materials were subjected to a tensile test, which gave a tensile strength of 18.0 kg/cm$^2$.

EXAMPLE 4

4-A

A polycarbodiimide resin solution obtained in the same manner as in Example 1 was concentrated to 30% in terms of resin amount, using an evaporator. The resulting concentrate was mixed with a graphite powder (average particle diameter: 25 $\mu$m) of the following amount per 100 parts by weight of the resin.

4-A-1 10 parts by weight
4-A-2 30 parts by weight
4-A-3 50 parts by weight
4-A-4 80 parts by weight
4-A-5 90 parts by weight Each of the resulting mixtures was placed between
graphite plates,
vitreous carbon plates, or
alumina plates, then dried at 120° C. for 2 hours in a dryer, and fired at 1,200° C. in a vacuum, whereby the plates were adhered.

The thus obtained 15 materials were subjected to a tensile test. The results are shown in Table 2. In Table 2, each numerical figure indicates an adhesion strength (unit:kg/cm²) (the same applies hereinafter).

TABLE 2

| No. | Graphite plates | Vitreous carbon plates | Alumina plates |
| --- | --- | --- | --- |
| 4-A-1 | 15.7 | 12.8 | 13.2 |
| 4-A-2 | 16.8 | 14.7 | 14.0 |
| 4-A-3 | 17.0 | 15.2 | 18.0 |
| 4-A-4 | 18.0 | 16.0 | 15.0 |
| 4-A-5 | 16.7 | 15.0 | 14.8 |

4-B

Using the polycarbodiimide resin solutions 4-A-2 and 4-A-3 prepared as above, there were prepared two polycarbodiimide sheets 4-B-1 and 4-B-2, respectively, by a dry method.

Each of these sheets was placed between
graphite plates,
vitreous carbon plates, or
alumina plates.

Then, press bonding was effected at 200° C., after which firing was effected as in the case of 4-A. The thus obtained six materials were subjected to a tensile test. The results are shown in Table 3.

TABLE 3

| No. | Graphite plates | Vitreous carbon plates | Alumina plates |
| --- | --- | --- | --- |
| 4-B-1 | 17.9 | 16.0 | 15.0 |
| 4-B-2 | 19.0 | 18.2 | 18.7 |

4-C

Using the polycarbodiimide resin solutions 4-A-2 and 4-A-3 prepared as above, a polycarbodiimide fiber was prepared by a dry method. The fiber was processed into a cloth 4-C-1 using a weaving machine.

The cloth 4-C-1 was placed between
graphite plates,
vitreous carbon plates, or
alumina plates.

Then, press bonding was effected at 200° C., after which firing was effected as in the case of 2-A. The thus obtained three materials were subjected to a tensile test. The results are shown in Table 4.

TABLE 4

| No. | Graphite plates | Vitreous carbon plates | Alumina plates |
| --- | --- | --- | --- |
| 4-C-1 | 17.5 | 16.8 | 15.9 |

EXAMPLE 5

The 4-B-2 sheet (containing 50 parts by weight of graphite) used in Example 4 was placed between quartz plates. Then, press bonding was effected at 250° C., after which firing was effected at 1,000° C. in vacuum. The resulting material was subjected to a tensile test. The tensile strength was 15.0 kg/cm².

EXAMPLE 6

The Example 4-A-3, i.e. the graphite plates containing there between the polycarbodiimide resin solution containing 50 parts by weight, relative to the resin amount, of a graphite powder was fired again at 3,000° C. in argon.

The resulting graphite plates were subjected to a tensile test. The adhesion strength was 18.0 kg/cm².

COMPARATIVE EXAMPLE 4

A liquid phenolic resin [Sumilite Resin (trade name) manufactured by Sumitomo Bakelite] was mixed with 50 parts by weight, relative to 100 parts by weight of the resin, of a graphite powder. The resulting mixture was placed between graphite plates as in the case of 4-A-3 (Example 4), to obtain adhered graphite plates.

The adhered graphite plates were subjected to a tensile test. The tensile strength was 3.0 kg/cm².

COMPARATIVE EXAMPLE 5

A polyacrylonitrile resin powder was dissolved in dimethylformamide to prepare a 30% polymer solution. The solution was mixed with 50 parts by weight, relative to 100 parts by weight of the resin, of a graphite powder. The resulting mixture was placed between graphite plates as in the case of 4-A, to obtain adhered graphite plates.

The adhered graphite plates were subjected to a tensile test. The tensile strength was 1.0 kg/cm².

EXAMPLE 7

A polycarbodiimide resin solution obtained in the same manner as in Example 1 was concentrated to 30% in terms of resin amount. The concentrate was mixed with a coal coke powder (average particle diameter: 25 μm) of the following amount relative to 100 parts by weight of the resin.

7-1 30 parts by weight
7-2 50 parts by weight
7-3 70 parts by weight

Each of the mixtures was placed between
graphite plates,
vitreous carbon plates, or
alumina plates, then dried at 120° C. for 2 hours in a dryer, and fired at 1,200° C. in vacuum, whereby each of the two plates was adhered.

The thus obtained nine materials were subjected to a tensile test. The results are shown in Table 5.

TABLE 5

| No. | Graphite plates | Vitreous carbon plates | Alumina plates |
| --- | --- | --- | --- |
| 7-1 | 19.0 | 13.0 | 13.2 |
| 7-2 | 20.5 | 15.2 | 15.0 |
| 7-3 | 22.0 | 15.3 | 18.0 |

EXAMPLE 8

The 30% polycarbodiimide resin solution obtained in Example 7 was mixed with a carbon black (Denka Black manufactured by DENKI KAGAKU KOGYO K.K.) of the following amount relative to 100 parts by weight of the resin.

8-1 10 parts by weight
8-2 20 parts by weight
8-3 30 parts by weight.

Each of the resulting mixtures was placed between
graphite plates,
vitreous carbon plates, or
alumina plates.
Then, firing was effected in the same manner as in Example 5, whereby adhered plates were obtained.

The thus obtained nine materials were subjected to a tensile test. The results are shown in Table 6.

TABLE 6

| No. | Graphite plates | Vitreous carbon plates | Alumina plates |
|---|---|---|---|
| 8-1 | 12.0 | 10.2 | 10.0 |
| 8-2 | 13.1 | 11.3 | 10.8 |
| 8-3 | 13.0 | 10.5 | 10.9 |

EXAMPLE 9

9-A

A polycarbodiimide resin solution obtained in the same manner as in Example 1 was concentrated to 25% in terms of resin amount, using an evaporator. The concentrate was mixed with a graphite powder (average particle diameter: 1 μm) and a binder pitch in the proportions shown in Table 7, to prepare five solution adhesives.

TABLE 7

| No. | Polycarbodiimide | Graphite powder | Binder pitch |
|---|---|---|---|
| 8-A-1 | 100 | 60 | 40 |
| 8-A-2 | 100 | 25 | 25 |
| 8-A-3 | 100 | 25 | 15 |
| 8-A-4 | 100 | 20 | 20 |
| 8-A-5 | 100 | 15 | 15 |

(In Table 7, each numerical figure is shown in parts by weight.)

Each of the solution adhesives was coated on
graphite plates,
vitreous carbon plates, or
alumina plates,
then dried at 120° C. for 2 hours in a dryer, and heat-treated to 1,200° C. in a vacuum, whereby adhered plates were obtained.

The thus obtained 15 materials were subjected to a tensile test. The results are shown in Table 8.

TABLE 8

| No. | Graphite plates | Vitreous carbon plates | Alumina plates |
|---|---|---|---|
| 8-A-1 | 159 | 70 | 75 |
| 8-A-2 | 205 | 80 | 83 |
| 8-A-3 | 200 | 80 | 85 |
| 8-A-4 | 197 | 73 | 80 |
| 8-A-5 | 200 | 60 | 75 |

8-B

The polycarbodiimide resin solution prepared in Example 8-A was concentrated to 25% in terms of resin amount in the same manner as in Example 8. The concentrate was mixed with a coal coke powder (average particle diameter: 1 μm) and an impregnating pitch in the proportions shown in Table 9, to prepare five solution adhesives.

TABLE 9

| No. | Polycarbodiimide | Coal coke | Impregnating pitch |
|---|---|---|---|
| 8-B-1 | 100 | 60 | 40 |
| 8-B-2 | 100 | 25 | 25 |
| 8-B-3 | 100 | 25 | 15 |
| 8-B-4 | 100 | 20 | 20 |
| 8-B-5 | 100 | 15 | 15 |

(In Table 9, each numerical figure is shown in parts by weight.)

Each of the solution adhesives was coated on
graphite plates,
vitreous carbon plates, or
alumina plates,
and adhered plates were obtained in the same manner as in 8-A.

The thus obtained 15 materials were subjected to a tensile test. The results are shown in Table 10.

TABLE 10

| No. | Graphite plates | Vitreous carbon plates | Alumina plates |
|---|---|---|---|
| 8-B-1 | 300 | 100 | 120 |
| 8-B-2 | 250 | 120 | 110 |
| 8-B-3 | 350 | 117 | 130 |
| 8-B-4 | 200 | 103 | 120 |
| 8-B-5 | 220 | 110 | 115 |

8-C

Using the solution adhesives 8-B-2 and 8-B-3 prepared in 8-B, there were prepared sheet-shaped adhesives 8-C-1 and 8-C-2 each of 100 μm in thickness, respectively, by a dry method.

Each of the sheets was placed between
graphite plates, or
quartz plates,
and press bonding was effected at 200° C. Then, they were subjected to the same heat treatment as in 8-A, whereby adhered plates were prepared.

The thus obtained four materials were subjected to a tensile test. The results are shown in Table 11.

TABLE 11

| No. | Graphite plates | Quartz plates |
|---|---|---|
| 8-C-1 | 230 | 150 |
| 8-C-2 | 330 | 180 |

EXAMPLE 9

The Example 8-A-3, i.e. the graphite plates containing the adhesive 1-A-3 there between, was subjected again to a heat treatment at 3,000° C. in argon. The resulting graphite plates were subjected to a tensile test. The adhesion strength was 197 kg/cm$^2$.

COMPARATIVE EXAMPLE 6

Using a liquid phenolic resin [Sumilite Resin (trade name) manufactured by Sumitomo Bakelite], an adhesive of the following composition was prepared.

Resin: 100 parts by weight
Graphite powder: 25 parts by weight
Binder pitch: 15 parts by weight (The graphite powder had an average particle diameter of 1 µm.)

The adhesive was placed between graphite plates in the same manner as in Example 8-A-3(Example 9), to prepare adhered graphite plates. This material was subjected to a tensile test. The adhesion strength was 20 kg/cm².

What is claimed is:

1. An article of manufacture comprising a heat-resistant adhesive provided between two surfaces, said adhesive comprising a carbonized resin prepared by firing a resin in a vacuum or an inert atmosphere, wherein the carbonized resin is a carbonized polycarbodiimide resin.

2. An article of manufacture comprising a heat-resistant adhesive provided between two surfaces, said adhesive comprising a carbonized resin and a powdery filler, said carbonized resin prepared by firing a resin in a vacuum or an inert atmosphere, wherein the carbonized resin is a carbonized polycarbodiimide resin.

3. An article of manufacture comprising a heat-resistant adhesive provided between two surfaces, said adhesive comprising a carbonized resin, a powdery filler and a pitch, said carbonized resin prepared by firing a resin in a vacuum or an inert atmosphere, wherein the carbonized resin is a carbonized polycarbodiimide resin.

4. An article according to any one of claims 1, 2 and 3, wherein the carbonized polycarbodiimide resin is a carbonized homopolymer or carbonized copolymer comprising at least one repeating unit represented by the formula

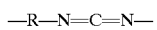

where R is an organic diisocyanate residue.

5. An article according to claim 2 or claim 3, wherein the powdery filler is a graphite powder, or a coke powder.

6. An article according to claim 2 wherein the proportion of the powdery filler is 100 to 5 parts by weight per 100 parts by weight of the carbonized resin.

7. An article according to claim 2, wherein the proportion of the powdery filler is 90 to 10 parts by weight.

8. An article according to claim 3 wherein the proportions of the powdery filler and the pitch are 80 to 5 parts by weight and 50–5 parts by weight, respectively, per 100 parts by weight of the carbonized resin.

9. An article according to claim 3, wherein the proportions of the powdery filler and the pitch are 60 to 10 parts by weight and 40–10 parts by weight, respectively, per 100 parts by weight of the carbonized resin.

* * * * *